US011873765B1

United States Patent
Humes (10) Patent No.: US 11,873,765 B1
(45) Date of Patent: Jan. 16, 2024

(54) FLYWHEEL POWERED BARRING ENGINE FOR GAS TURBINE ENGINE

(71) Applicant: Rolls-Royce North American Technologies Inc., Indianapolis, IN (US)

(72) Inventor: Ryan C. Humes, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/095,220

(22) Filed: Jan. 10, 2023

(51) Int. Cl.
*F02C 7/32* (2006.01)
*F02C 6/14* (2006.01)

(52) U.S. Cl.
CPC .................. *F02C 7/32* (2013.01); *F02C 6/14* (2013.01); *F05D 2260/4031* (2013.01); *F05D 2260/43* (2013.01)

(58) Field of Classification Search
CPC .... F05D 2260/42; F05D 2260/43; F02C 7/26; F02C 7/268; F02C 6/14; F02C 7/32; F02C 7/36; B64D 41/00; B60K 6/30; B60K 6/105; F01D 25/34; F01D 21/00
See application file for complete search history.

(56) References Cited

U.S. PATENT DOCUMENTS

| | | | |
|---|---|---|---|
| 5,460,138 A | 10/1995 | Hasegawa | |
| 5,760,506 A | 6/1998 | Ahlstrom et al. | |
| 7,654,238 B2 | 2/2010 | Steiner et al. | |
| 9,726,132 B2 | 8/2017 | Pawlicki | |
| 9,970,328 B2 | 5/2018 | Haerms et al. | |
| 10,378,442 B2 | 8/2019 | Jackowski et al. | |
| 10,760,498 B2 | 9/2020 | Cannella et al. | |
| 10,801,731 B2 | 10/2020 | Clauson et al. | |
| 2011/0114406 A1* | 5/2011 | Gibson | B60K 6/105 180/65.21 |
| 2013/0325287 A1* | 12/2013 | Ribarov | B60K 6/105 701/99 |
| 2014/0093399 A1* | 4/2014 | Pratelli | F04B 35/00 417/319 |
| 2022/0194613 A1* | 6/2022 | Lima | F02C 7/32 |

FOREIGN PATENT DOCUMENTS

CN 215256671 12/2021

* cited by examiner

*Primary Examiner* — Scott J Walthour
*Assistant Examiner* — David P. Olynick
(74) *Attorney, Agent, or Firm* — Barnes & Thornburg LLP (57) ABSTRACT

A gas turbine engine system includes a gas turbine engine, an accessory gearbox, and a flywheel powered barring engine system. The gas turbine engine includes a rotor and a turbine. The accessory gearbox is connected with the rotor. The flywheel powered barring engine system is connected with the accessory gearbox and configured to rotate the rotor after shut down of the gas turbine engine.

11 Claims, 5 Drawing Sheets

FLYWHEEL POWERED BARRING ENGINE FOR GAS TURBINE ENGINE

FIELD OF THE DISCLOSURE

The present disclosure relates generally to gas turbine engines, and more specifically to a flywheel powered barring engine adapted for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high-pressure air to the combustor. In the combustor, fuel is mixed with the high-pressure air and is ignited. Products of the combustion reaction in the combustor are directed into the turbine where work is extracted to drive the compressor and, sometimes, an output shaft. Leftover products of the combustion are exhausted out of the turbine and may provide thrust in some applications.

Gas turbine engines also typically include a rotor coupling the turbine with the compressor and/or fan. Rotors may be exposed to temperature gradients as the gas turbine engine cools after the gas turbine engine is shut down. Some rotors may cool non-uniformly after shut down of the gas turbine engine. In some examples, gas turbine engines may use specific start up sequences or may include a dedicated motor to turn the rotor during cool down of the gas turbine engine.

SUMMARY

The present disclosure may comprise one or more of the following features and combinations thereof.

A gas turbine engine system may comprise a gas turbine engine, an accessory gearbox, and a flywheel powered barring engine system. The gas turbine engine may have a rotor and a turbine coupled with the rotor for rotation about an axis with the rotor. The accessory gearbox may be connected with the rotor of the gas turbine engine. The accessory gearbox may be configured to be driven by the rotor of the gas turbine engine during operation of the gas turbine engine to power auxiliary sub-systems for the gas turbine engine In some embodiments, the flywheel powered barring engine system may be connected with the accessory gearbox. The flywheel powered barring engine system may be configured to drive rotation of the rotor of the gas turbine engine about the axis via the accessory gearbox after the gas turbine engine is shut down.

In some embodiments, the barring engine system may include an accessory gearbox shaft, a flywheel shaft assembly, and a barring engine. The accessory gearbox shaft may be coupled with the accessory gearbox and configured to be driven by and to drive the accessory gearbox. The flywheel shaft assembly may be configured to store rotational energy from the accessory gearbox during operation of the gas turbine engine. The flywheel shaft assembly may include a flywheel shaft and a flywheel coupled with the flywheel shaft for rotation therewith. The barring engine may be configured to selectively allow the accessory gearbox shaft to drive the flywheel shaft and the flywheel shaft to drive the accessory gearbox shaft.

In some embodiments, the barring engine may include a barring shaft assembly, a first overrunning clutch, and a second overrunning clutch. The first overrunning clutch may be coupled between the accessory gearbox shaft and the flywheel shaft. The first overrunning clutch may be configured to transfer rotational energy from the accessory gearbox shaft to the flywheel shaft in response to the accessory gearbox shaft rotating at a rotational speed greater than a rotational speed of the flywheel shaft.

In some embodiments, the second overrunning clutch may be coupled between the barring shaft assembly and the accessory gearbox shaft. The second overrunning clutch may be configured to transfer rotational energy from the barring shaft assembly to the accessory gearbox shaft in response to the barring shaft assembly being driven by the flywheel shaft at a rotational speed greater than the rotational speed of the accessory gearbox shaft to cause the flywheel shaft to drive rotation of the rotor of the gas turbine engine about the axis via the accessory gearbox shaft and the accessory gearbox after the gas turbine engine is shut down to prevent bowing of the rotor due to thermal gradients within the gas turbine engine.

In some embodiments, the first overrunning clutch may be a sprag clutch. The second overrunning clutch may be a sprag clutch. In some embodiments, the accessory gearbox shaft may include a first section and a second section. The first section may be located between the second section and the accessory gearbox. The second section may extend circumferentially around the flywheel shaft.

In some embodiments, the first overrunning clutch may be coupled between the second section and the flywheel shaft. The barring shaft assembly may include a barring shaft and a reduction gearbox. The reduction gearbox may be connected between the flywheel shaft and the barring shaft. The second overrunning clutch may be coupled between the barring shaft and the first section of the accessory gearbox shaft.

In some embodiments, the barring shaft may include a first shaft and a second shaft. The first shaft may be connected with the reduction gearbox. The second shaft may be arranged circumferentially around the first section of the accessory gearbox shaft. The second shaft may be connected to the first shaft of the barring shaft via a gear coupling.

In some embodiments, the barring shaft assembly may include a barring shaft and a reduction gearbox. The reduction gearbox may be connected between the flywheel shaft and the barring shaft. In some embodiments, the reduction gearbox may be configured to drive rotation of the barring shaft at the rotational speed of the barring shaft which is less than the rotational speed of the flywheel shaft.

In some embodiments, the barring shaft may include a first shaft and a second shaft. The first shaft may be connected with the reduction gearbox. The second shaft may be arranged circumferentially around the accessory gearbox shaft. The second shaft may be connected to the first shaft via a gear coupling. The second overrunning clutch may be configured to engage with the accessory gearbox shaft only when the gas turbine engine is shut down.

According to another aspect of the present disclosure, a barring engine system for a gas turbine engine may include an accessory gearbox shaft, a flywheel shaft assembly, and a barring engine. The accessory gearbox shaft may be configured to rotate about an axis. The flywheel shaft assembly may be configured to store rotational energy from the accessory gearbox shaft during operation of the gas turbine engine. The flywheel shaft assembly may include a flywheel shaft and a flywheel coupled with the flywheel shaft for rotation therewith.

In some embodiments, the barring engine may be configured to selectively allow the accessory gearbox shaft to drive the flywheel shaft and the flywheel shaft to drive the accessory gearbox shaft. The barring engine may include a barring shaft assembly, a first overrunning clutch, and a second overrunning clutch. The first overrunning clutch may be coupled between the accessory gearbox shaft and the flywheel shaft. The first overrunning clutch may be configured to transfer rotational energy from the accessory gearbox shaft to the flywheel shaft in response to the accessory gearbox shaft rotating at a rotational speed greater than a rotational speed of the flywheel shaft.

In some embodiments, the second overrunning clutch may be coupled between the barring shaft assembly and the accessory gearbox shaft. The second overrunning clutch may be configured to transfer rotational energy from the barring shaft assembly to the accessory gearbox shaft in response to the barring shaft assembly being driven by the flywheel shaft at a rotational speed of the barring shaft assembly greater than a rotational speed of the accessory gearbox shaft.

In some embodiments, the second overrunning clutch may be decoupled from the accessory gearbox shaft when the accessory gearbox shaft is rotating faster than the rotational speed of the barring shaft assembly. The first overrunning clutch may be decoupled from the flywheel shaft when the flywheel shaft is rotating faster than the accessory gearbox shaft.

In some embodiments, the first overrunning clutch may be a sprag clutch. The second overrunning clutch may be a sprag clutch. In some embodiments, the barring shaft assembly may include a barring shaft and a reduction gearbox. The reduction gearbox may be connected between the flywheel shaft and the barring shaft. The barring shaft may be connected with the accessory gearbox shaft via the second overrunning clutch.

In some embodiments, the barring shaft may include a first shaft and a second shaft. The first shaft may be connected with the reduction gearbox. The second shaft may be connected with the first shaft and the accessory gearbox shaft via the second overrunning clutch. The second overrunning clutch may be configured to engage with the accessory gearbox shaft in response to the flywheel shaft rotating and the first overrunning clutch being disengaged between the flywheel shaft and the accessory gearbox shaft.

A method of rotating a rotor of a gas turbine engine system may include providing a gas turbine engine, an accessory gearbox, and a flywheel powered barring engine system. The gas turbine engine may have a rotor and a turbine coupled with the rotor for rotation about an axis with the rotor. The accessory gearbox may be configured to be driven by the rotor of the gas turbine engine. The flywheel powered barring engine system may include an accessory gearbox shaft, a flywheel shaft assembly, and a barring engine. The flywheel shaft assembly may have a flywheel shaft and a flywheel. The barring engine may include a barring shaft assembly, a first overrunning clutch, and a second overrunning clutch. The accessory gearbox may be coupled with the rotor of the gas turbine engine. The flywheel powered barring engine system may be coupled with the accessory gearbox via the accessory gearbox shaft.

In some embodiments, the method may further include operating the gas turbine engine so that the rotor of the gas turbine engine drives the accessory gearbox. In some embodiments, the method may further include driving the flywheel shaft via the accessory gearbox shaft so that rotational energy from the accessory gearbox is stored in the flywheel.

In some embodiments, the method may further include shutting down the gas turbine engine. In some embodiments, the method may further include driving the accessory gearbox shaft via the flywheel shaft so that the flywheel drives rotation of the rotor of the gas turbine engine.

In some embodiments, the first overrunning clutch may be coupled between the accessory gearbox shaft and the flywheel shaft. The first overrunning clutch may be configured to transfer rotational energy from the accessory gearbox shaft to the flywheel shaft during the driving of the flywheel shaft step.

In some embodiments, the second overrunning clutch may be coupled between the barring shaft assembly and the accessory gearbox shaft. The second overrunning clutch may be configured to transfer rotational energy from the flywheel shaft and the barring shaft assembly to the accessory gearbox shaft during the driving the accessory gearbox shaft step.

These and other features of the present disclosure will become more apparent from the following description of the illustrative embodiments.

BRIEF DESCRIPTION OF THE DRAWINGS

FIG. 2 is a diagrammatic view of the flywheel powered barring engine system connected with the accessory gearbox of FIG. 1 and configured to drive rotation of the rotor of the gas turbine engine via the accessory gearbox after the gas turbine engine is shut down, the flywheel powered barring engine system includes an accessory gearbox shaft coupled with the accessory gearbox, a flywheel shaft assembly configured to store rotational energy from the accessory gearbox during operation of the gas turbine engine, and a barring engine configured to selectively allow the accessory gearbox shaft to drive a flywheel shaft of the flywheel shaft assembly and the flywheel shaft to drive the accessory gearbox shaft, the barring engine includes a barring shaft assembly, a first overrunning clutch, and a second overrunning clutch;

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
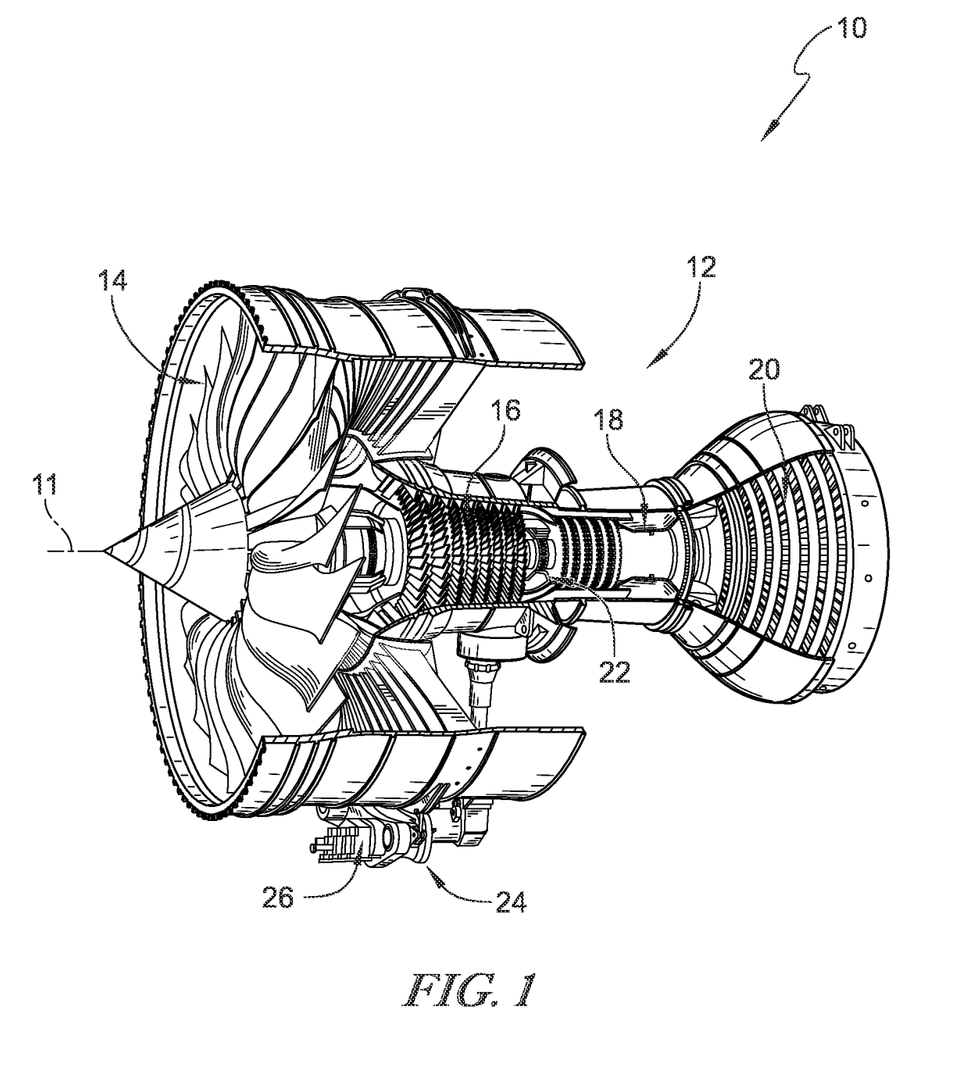
FIG. 1 is a perspective view of a gas turbine engine system in accordance with the present disclosure, the gas turbine engine system includes a gas turbine engine having a fan, a compressor, a combustor, a turbine, and a rotor, an accessory gearbox coupled with the rotor, and a flywheel powered barring engine system configured to drive the rotor of the gas turbine engine during shut down and cool down of the gas turbine engine.

An illustrative gas turbine engine system 10 includes a gas turbine engine 12, an accessory gearbox 24 coupled with the gas turbine engine 12 and illustratively located beneath the gas turbine engine 12, and a flywheel powered barring system 26 coupled with the accessory gearbox 24 as shown in FIG. 1. The gas turbine engine 12 includes a fan 14, a compressor 16, a combustor 18, a turbine 20, and a rotor 22 as shown in FIG. 1. The fan 14 is driven by the turbine 20 and provides thrust for propelling an air vehicle, for example. The compressor 16 compresses and delivers pressurized air to the combustor 18. The combustor 18 mixes fuel with the compressed air received from the compressor 16 and ignites the fuel. The hot, high-pressure products of the combustion reaction in the combustor 18 are directed into the turbine 20. The turbine 20 is coupled with the rotor 22 for rotation about a central axis 11 with the rotor 22. The turbine 20 drives the compressor 16 and the fan 14 via the rotor 22 in the illustrative embodiment.

The accessory gearbox 24 is connected with the rotor 22 of the gas turbine engine 12 as suggested in FIG. 1. The accessory gearbox 24 may include a plurality of gears, pumps, and motors and is configured to be driven by the rotor 22 during operation of the gas turbine engine 12 to power auxiliary sub-systems such as, for example, a fuel pump, an oil pump, and/or other components of the gas turbine engine 12. The flywheel powered barring engine system 26 is connected to the accessory gearbox 24 and is configured to drive rotation of the rotor 22 about the axis 11 via the accessory gearbox 24 after the gas turbine engine 12 has been shut down to prevent bowing of the rotor 22 due to thermal gradients within the gas turbine engine 12.

The flywheel powered barring engine system 26 includes an accessory gearbox shaft 28, a flywheel shaft assembly 30, and a barring engine 32 as shown in FIGS. 2-5. The accessory gearbox shaft 28 is coupled to the accessory gearbox 24 and configured to be driven by and to drive the accessory gearbox 24. The flywheel shaft assembly 30 is configured to store rotational energy from the accessory gearbox 24 during operation of the gas turbine engine 12. The barring engine 32 is configured to selectively allow the accessory gearbox shaft 28 to drive the flywheel shaft assembly 30 and the flywheel shaft assembly 30 to drive the accessory gearbox shaft 28. The accessory gearbox shaft 28 drives the flywheel shaft assembly 30 during operation of the gas turbine engine 12 as suggested in FIG. 3. The flywheel shaft assembly 30 drives rotation of the rotor 22 of the gas turbine engine 12 via the accessory gearbox shaft 28 and the accessory gearbox 24 after the gas turbine engine 12 has been shut down to prevent bowing of the rotor 22 as suggested in FIG. 5.

Some gas turbine engines experience rotor bowing after the engine is shut down. After such gas turbine engines are shut down, the engine cools and the rotor remains stationary. A thermal gradient forms in the gas turbine engine after shut down such that the rotor of the gas turbine engine experiences asymmetrical cooling. Because the rotor does not cool uniformly, the rotor may experience bending, also known as rotor bow. Starting an engine with a bowed rotor may lead to high vibrations within the engine and/or rubbing between components of the gas turbine engine, which may lead to damage to the gas turbine engine.

Figure 4:
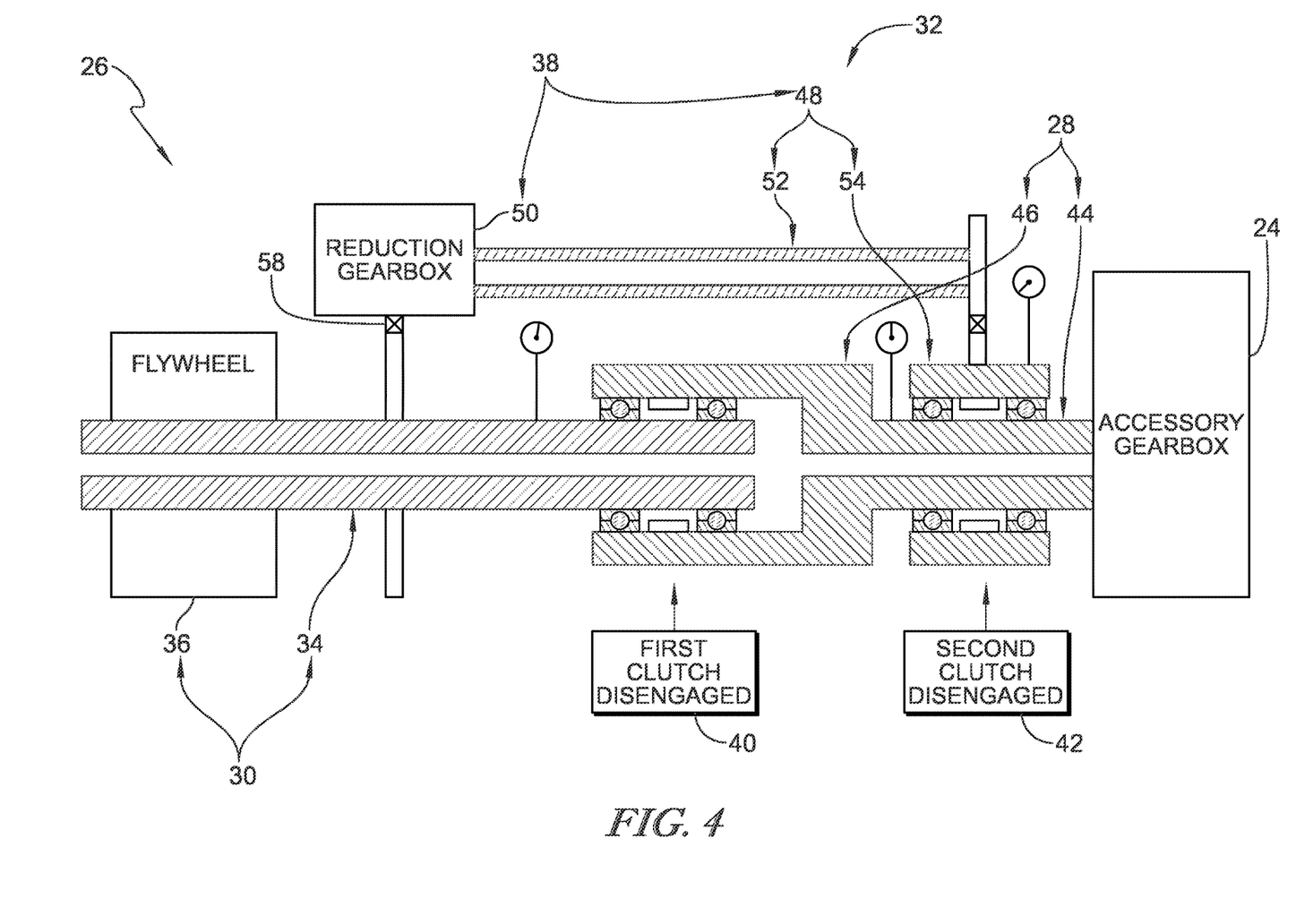
FIG. 4 is a diagrammatic view of the flywheel powered barring engine system of FIG. 2 during a phase of shut down of the gas turbine engine in which the rotor is slowing down, the second overrunning clutch coupled between the barring shaft assembly and the accessory gearbox shaft is disengaged and the first overrunning clutch coupled between the accessory gearbox shaft and the flywheel shaft is disengaged to cause the accessory gearbox shaft and the flywheel shaft to rotate independently.
Figure 5:
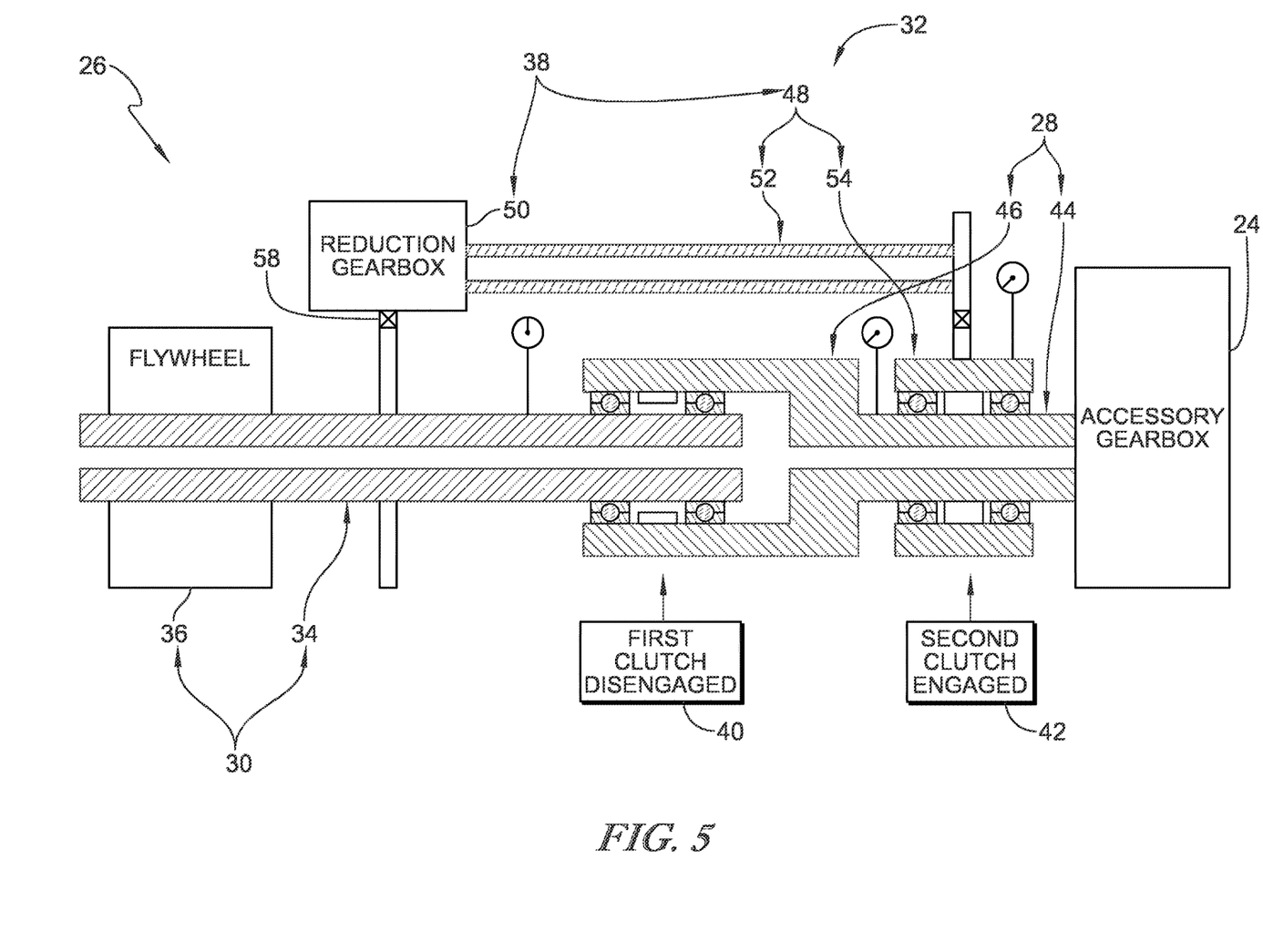
FIG. 5 is a diagrammatic view of the flywheel powered barring engine system of FIG. 2 after shut down of the gas turbine engine, the first overrunning clutch coupled between the accessory gearbox shaft and the flywheel shaft is disengaged and the second overrunning clutch coupled between the barring shaft assembly and the accessory gearbox shaft is engaged and configured to transfer rotational energy from the flywheel shaft, to the barring shaft assembly, to the accessory gearbox shaft to cause the flywheel shaft to drive rotation of the rotor of the gas turbine engine to assist in uniform thermal gradients in the rotor as the engine cools.

The gas turbine engine system 10 of the present disclosure includes the flywheel powered barring engine system 26 to rotate the rotor 22 after the gas turbine engine 12 has been shut down to prevent bowing of the rotor 22 as suggested in FIG. 5. The flywheel powered barring engine system 26 includes the accessory gearbox shaft 28, the flywheel shaft assembly 30, and the barring engine 32 as shown in FIGS. 2-5.

The accessory gearbox shaft 28 is coupled to the accessory gearbox 24 as shown in FIGS. 2-5. During operation of the gas turbine engine 12, the accessory gearbox shaft 28 is driven by the accessory gearbox 24 and transfers rotational energy to the flywheel shaft assembly 30 for storage as kinetic energy. After the gas turbine engine 12 is shut down, the kinetic energy of the flywheel shaft assembly 30 is transferred to the accessory gearbox shaft 28 to drive the accessory gearbox 24 and the rotor 22 as suggested in FIG. 5.

Figure 2:
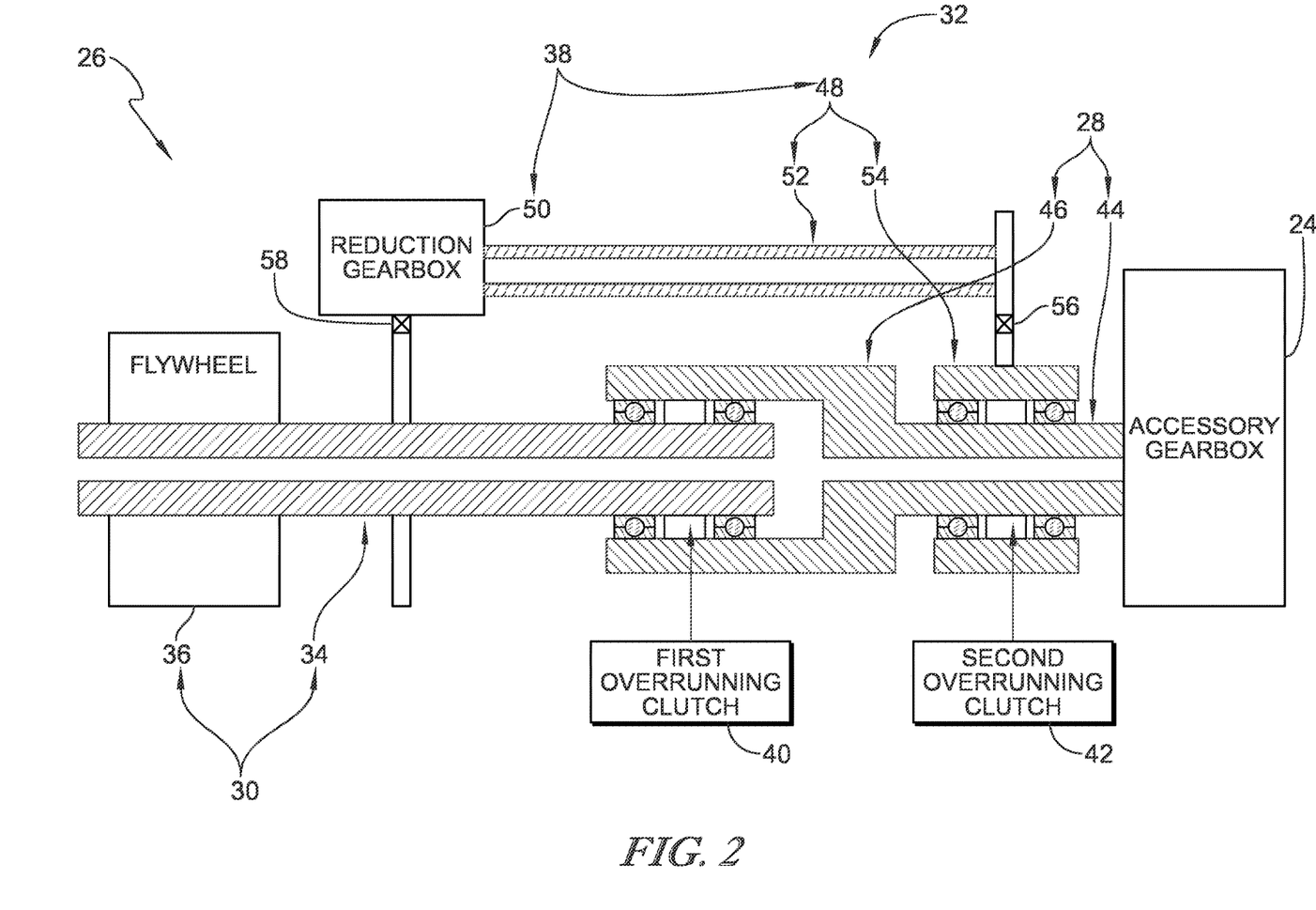

The accessory gearbox shaft 28 in the illustrative embodiment includes a first section 44 and a second section 46 coupled with the first section 44 as shown in FIG. 2. In other embodiments, the accessory gearbox shaft 28 is a generally single segment shaft with a constant outer diameter. The first section 44 of the accessory gearbox shaft 28 is coupled to the accessory gearbox 24 and located between the second section 46 and the accessory gearbox 24. The first section 44 has a first diameter that is smaller than a second diameter of the second section 46. The first section 44 is mechanically connected with the accessory gearbox 24 for rotation.

The second section 46 of the accessory gearbox shaft 28 is coupled to the flywheel shaft assembly 30 as shown in FIG. 2. The second section 46 is located between the flywheel shaft assembly 30 and the first section 44 of the accessory gearbox shaft 28. The second section 46 is integrally formed with the first section 44 in the illustrative embodiment. A portion of the flywheel shaft assembly 30 is received within the second section 46 in the illustrative embodiment. The accessory gearbox shaft 28 is driven by the accessory gearbox 24 during operation of the gas turbine engine 12 as suggested in FIG. 3. After the gas turbine engine 12 has been shut down, the accessory gearbox shaft 28, and more specifically, the first section 44 of the accessory gearbox shaft 28, is driven by the flywheel shaft assembly 30 as suggested in FIG. 5.

The flywheel shaft assembly 30 incudes a flywheel shaft 34 and a flywheel 36 as shown in FIGS. 2-5. The flywheel 36 is coupled to the flywheel shaft 34 for rotation therewith. The flywheel 36 has a size and mass as desired to store kinetic energy from the accessory gearbox 24 during use of the gas turbine engine 12 such that the kinetic energy will rotate the rotor 22 at least at a threshold speed for a threshold period of time after shut down of the gas turbine engine 12.

The flywheel shaft 34 is located between the flywheel 36 and the second section 46 of the accessory gearbox shaft 28. The second section 46 is arranged circumferentially around the flywheel shaft 34. The flywheel shaft 34 is circumferentially aligned with the first section 44 of the accessory gearbox shaft 28. The flywheel 36 stores rotational energy from the rotor 22 and the accessory gearbox 24 during operation of the gas turbine engine 12. The flywheel shaft 34 is driven by the accessory gearbox shaft 28 during operation of the gas turbine engine 12 as suggested in FIG. 3. After the gas turbine engine 12 has been shut down, the flywheel 36 drives the flywheel shaft 34, which drives the first section 44 of the accessory gearbox shaft 28 as suggested in FIG. 5.

The barring engine 32 includes a barring shaft assembly 38, a first overrunning clutch 40, and a second overrunning clutch 42 as shown in FIGS. 2-5. The barring engine 32 is configured to allow the accessory gearbox shaft 28 to drive the flywheel shaft 34 during operation of the gas turbine engine 12, as suggested in FIG. 3, and the flywheel shaft 34 to drive the accessory gearbox shaft 28 after the gas turbine engine 12 has been shut down, as suggested in FIG. 5. The barring shaft assembly 38 is coupled between the flywheel shaft 34 and the first section 44 of the accessory gearbox shaft 28. The first overrunning clutch 40 is coupled between the accessory gearbox shaft 28 and the flywheel shaft 34. The second overrunning clutch 42 is coupled between the barring shaft assembly 38 and the accessory gearbox shaft 28.

The illustrative barring shaft assembly 38 includes a barring shaft 48 and a reduction gearbox 50 as shown in FIGS. 2-5. The barring shaft 48 couples the flywheel shaft 34 to the first section 44 of the accessory gearbox shaft 28 via the reduction gearbox 50. The reduction gearbox 50 is coupled between the flywheel shaft 34 and the barring shaft 48 to reduce a rotational speed of the barring shaft 48 compared to the rotational speed of the flywheel shaft 34. In the illustrative embodiment, the reduction gearbox 50 causes the barring shaft to rotate about 1 to 5 revolutions for every 10,000 to 30,000 revolutions of the flywheel shaft 34. In some embodiments, the gear ratio of the reduction gearbox 50 is between 1000:1 and 30,000:1. The reduction gearbox 50 is configured to take the rotational speed of the flywheel shaft 34 after shut down of the gas turbine engine 12 and cause the barring shaft 48 to rotate the rotor 22 at about 1 to 10 RPM after the gas turbine engine 12 has shut down based on the rotational speed of the flywheel shaft 34 and the gear ratio of the accessory gearbox 24.

The barring shaft 48 includes a first shaft 52 and a second shaft 54 in the illustrative embodiment as shown in FIGS. 2-5. The first shaft 52 is located between the reduction gearbox 50 and the second shaft 54. The second shaft 54 is located between the first shaft 52 and the first section 44 of the accessory gearbox shaft 28. The second shaft 54 is arranged circumferentially around the first section 44 of the accessory gearbox shaft 28. The second shaft 54 is circumferentially aligned with the second section 46 of the accessory gearbox shaft 28. The first shaft 52 is connected to the second shaft 54 via a gear coupling 56. After the gas turbine engine 12 has been shut down, the barring shaft 48 is driven by the flywheel shaft 34 and the barring shaft 48 drives the first section 44 of the accessory gearbox shaft 28, as suggested in FIG. 5.

The reduction gearbox 50 is connected to the flywheel shaft 34 via a gear coupling 58 as shown in FIGS. 2-5. The reduction gearbox 50 is coupled between the flywheel shaft 34 and the first shaft 52 of the barring shaft 48. The reduction gearbox 50 transfers rotational energy from the flywheel shaft 34 to the barring shaft 48 as suggested in FIG. 5. When transferring the rotational energy from the flywheel shaft 34 to the barring shaft 48, the reduction gearbox 50 reduces the rotational speed such that the barring shaft 48 has a lower rotational speed than the flywheel shaft 34 as suggested in FIG. 5.

The first overrunning clutch 40 may be any device configured to transfer rotational energy from the accessory gearbox shaft 28 to the flywheel shaft 34 in response to the flywheel shaft 34 not overrunning (rotating faster than) the accessory gearbox shaft 28 and to allow the flywheel shaft 34 to overrun (rotate faster than) the accessory gearbox shaft 28. The first overrunning clutch 40 is configured to transfer rotational energy from the accessory gearbox shaft 28 to the flywheel shaft 34 during operation of the gas turbine engine 12 as suggested in FIG. 3. The first overrunning clutch 40 is coupled between the flywheel shaft 34 and the second section 46 of the accessory gearbox shaft 28. The first overrunning clutch 40 is shown diagrammatically in the drawings. In one embodiment, the first overrunning clutch 40 is a sprag clutch.

Figure 3:
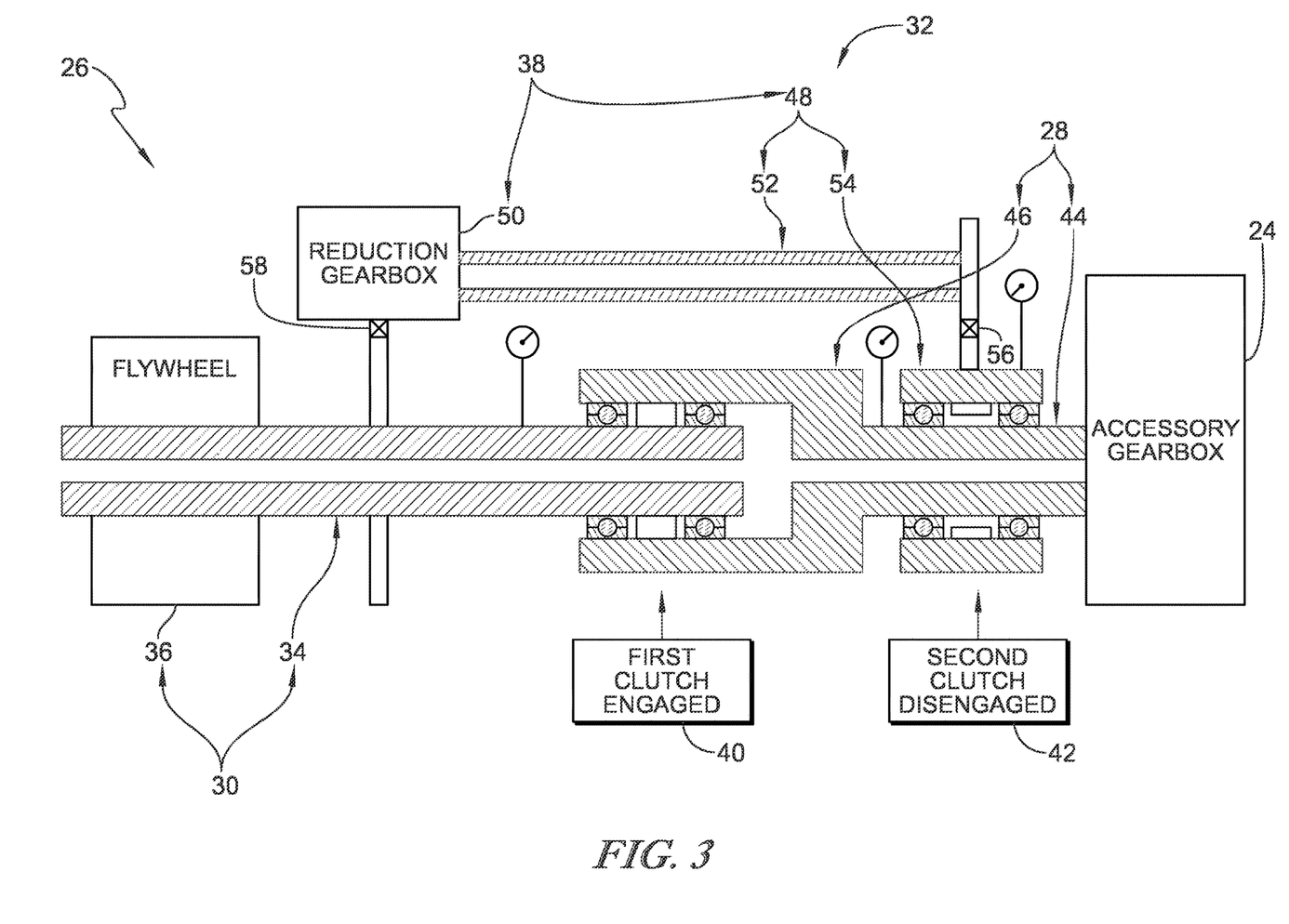
FIG. 3 is a diagrammatic view of the flywheel powered barring engine system of FIG. 2 during operation of the gas turbine engine such that the rotor of the engine is driving the accessory gearbox, the second overrunning clutch coupled between the barring shaft assembly and the accessory gearbox shaft is disengaged and the first overrunning clutch coupled between the accessory gearbox shaft and the flywheel shaft is engaged and configured to transfer rotational energy from the accessory gearbox shaft to the flywheel shaft.

During operation of the gas turbine engine 12, the first overrunning clutch 40 is engaged such that the first overrunning clutch 40 transfers rotational energy from the accessory gearbox shaft 28 to the flywheel shaft 34 as suggested in FIG. 3. As suggested by the illustrative and hypothetical gauges, the flywheel shaft 34 has a same rotational speed as the accessory gearbox shaft 28 during operation of the gas turbine engine 12 as suggested in FIG. 3. During a phase of shut down of the gas turbine engine 12, the accessory gearbox shaft 28 may slow down while the flywheel shaft 34 maintains its rotational speed due to the inertia of the flywheel 36 or slightly slows down as suggested in FIG. 4. During such period, the first overrunning clutch 40 is disengaged so that the first overrunning clutch 40 does not transfer rotational energy from the accessory gearbox shaft 28 to the flywheel shaft 34 as suggested in FIG. 4.

The second overrunning clutch 42 may be any device configured to transfer rotational energy from the barring shaft 48 to the accessory gearbox shaft 28 in response to the accessory gearbox shaft 28 not overrunning (rotating faster than) the barring shaft 48 and to allow the accessory gearbox shaft 28 to overrun (rotate faster than) the barring shaft 48. In one embodiment, the second overrunning clutch 42 is a sprag clutch. The second overrunning clutch 42 is configured to transfer rotational energy from the barring shaft 48 to the accessory gearbox shaft 28 after the gas turbine engine 12 has been shut down as suggested in FIG. 5. The second overrunning clutch 42 is coupled between the second shaft 54 of the barring shaft 48 and the first section 44 of the accessory gearbox shaft 28. During operation of the gas turbine engine 12, the second overrunning clutch 42 is disengaged such that the second overrunning clutch 42 does not transfer rotational energy from the barring shaft 48 to the accessory gearbox shaft 28 as suggested in FIG. 3. During a phase of shut down of the gas turbine engine 12, the second overrunning clutch 42 is disengaged so that the second overrunning clutch 42 does not transfer rotational energy from the barring shaft 48 to the accessory gearbox shaft 28 as suggested in FIG. 4.

After the gas turbine engine 12 is shut down, the accessory gearbox 24 is no longer being driven by the rotor 22 and its rotational speed greatly slows down as suggested by the gauge on the accessory gearbox shaft 28 in FIG. 5. The flywheel shaft 34 continues to rotate at a relatively high speed as suggested by the gauge on the flywheel shaft 34 due to the inertia of the flywheel 36. As a result, the first overrunning clutch 40 is disengaged and the flywheel shaft 34 overruns the accessory gearbox shaft 28 such that rotational energy is not transferred from the accessory gearbox shaft 28 to the flywheel shaft 34 as suggested in FIG. 5.

The rotational energy from the flywheel shaft 34 is transferred to the first shaft 52 of the barring shaft 48 and the rotational speed of the first shaft 52 is reduced due to the reduction gearbox 50. The first shaft 52 causes rotation of the second shaft 54 of the barring shaft 48 as suggested by the gauge on the second shaft 54. The second overrunning clutch 42 is engaged because the second shaft 54 is rotating faster than the accessory gearbox shaft 28. Rotational energy is transferred from the barring shaft 48 to the accessory gearbox shaft 28 as suggested in FIG. 5. As a result, the second shaft 54 rotates the accessory gearbox shaft 28 which drives the rotor 22 via the accessory gearbox 24.

Referring again to FIG. 3, when the gas turbine engine 12 is operating, the rotor 22 of the gas turbine engine 12 drives the accessory gearbox 24. The driving of the accessory gearbox 24 causes the accessory gearbox shaft 28 to rotate. During operation of the gas turbine engine 12, the accessory gearbox shaft 28 is rotating at a greater rotational speed than the barring shaft 48 as suggested in FIG. 3. Because the accessory gearbox shaft 28 is rotating at a greater rotational speed than the barring shaft 48, the second overrunning clutch 42 is overrun and disengaged from the first section 44 of the accessory gearbox shaft 28. The accessory gearbox shaft 28 is also rotating at a greater rotational speed than the flywheel shaft 34. When the accessory gearbox shaft 28 is rotating at a rotational speed that is greater than that of the flywheel shaft 34, the first overrunning clutch 40 is engaged. Thus, the first overrunning clutch 40 connects the second section 46 of the accessory gearbox shaft 28 and the flywheel shaft 34. When the first overrunning clutch 40 is engaged, the accessory gearbox shaft 28 transfers rotational energy to the flywheel shaft 34 and the flywheel 36 as suggested in FIG. 3. Thus, the accessory gearbox shaft 28 and the flywheel shaft 34 are rotating at similar rotational speeds. The flywheel 36 stores the rotational energy from the accessory gearbox 24 during operation of the gas turbine engine 12.

Referring to FIG. 4, during the phase of shut down of the gas turbine engine 12, the rotor 22 slows down. Because the rotor 22 is slowing down, the accessory gearbox 24 receives less rotational energy from the rotor 22. Thus, the rotational speed of the accessory gearbox shaft 28 decreases as compared to when the gas turbine engine 12 was operational as suggested in FIG. 4. The accessory gearbox shaft 28 still has a greater rotational speed than the barring shaft 48 such that the second overrunning clutch 42 remains disengaged from the accessory gearbox shaft 28 during the phase of shut down. The flywheel shaft 34 has a greater rotational speed during the phase of shut down than the accessory gearbox shaft 28 due to the rotational energy previously stored by the flywheel 36 during operation of the gas turbine engine 12. Because the flywheel shaft 34 has a greater rotational speed than the accessory gearbox shaft 28, the first overrunning clutch 40 is overrun and disengaged from the flywheel shaft 34. The accessory gearbox shaft 28, the barring shaft 48, and the flywheel shaft 34 rotate independently of one another and do not transfer rotational energy between one another during the phase of shut down of the gas turbine engine 12.

Referring to FIG. 5, after shut down of the gas turbine engine 12, the rotor 22 is no longer rotating. Because the rotor 22 is no longer rotating, the accessory gearbox shaft 28 is not receiving rotational energy from the rotor 22. The flywheel shaft 34 continues to rotate due to the rotational energy stored during operation of the gas turbine engine 12. The flywheel shaft 34 has a greater rotational speed than the accessory gearbox shaft 28, so the first overrunning clutch 40 is disengaged from the flywheel shaft 34. The barring shaft 48 also has a greater rotational speed than the accessory gearbox shaft 28 such that the second overrunning clutch 42 is engaged. The second overrunning clutch 42 connects the second shaft 54 of the barring shaft 48 and the first section 44 of the accessory gearbox shaft 28. The second overrunning clutch 42 transfers rotational energy from the barring shaft 48 to the accessory gearbox shaft 28. The second overrunning clutch 42 only engages with the accessory gearbox shaft 28 when the gas turbine engine 12 is shut down.

Thus, after the gas turbine engine 12 is shut down, the flywheel 36 drives the flywheel shaft 34, which transfers rotational energy to the reduction gearbox 50 as suggested in FIG. 5. The reduction gearbox 50 drives the barring shaft 48 at a rotational speed that is less than that of the flywheel shaft 34. The barring shaft 48 transfers rotational energy to the accessory gearbox shaft 28 via the second overrunning clutch 42. The accessory gearbox shaft 28 drives the accessory gearbox 24, and thus, the rotor 22 of the gas turbine engine 12 after shut down of the gas turbine engine 12. Therefore, the flywheel 36 drives rotation of the rotor 22 of the gas turbine engine 12 to prevent bowing of the rotor 22 after shut down of the gas turbine engine 12.

A method of rotating the rotor 22 of the gas turbine engine system 10 may include several steps. The method begins by providing the gas turbine engine 12, the accessory gearbox 24, and the flywheel powered barring engine system 26. The gas turbine engine 12 includes the rotor 22 and the turbine 20 coupled with the rotor 22 for rotation about the axis 11 with the rotor 22. The accessory gearbox 24 is configured to be driven by the rotor 22 of the gas turbine engine 12. The flywheel powered barring engine system 26 includes the accessory gearbox shaft 28, the flywheel shaft assembly 30, and the barring engine 32. The flywheel shaft assembly 30 includes the flywheel shaft 34 and the flywheel 36. The barring engine 32 includes the barring shaft assembly 38, the first overrunning clutch 40, and the second overrunning clutch 42. The accessory gearbox 24 is coupled with the rotor 22 of the gas turbine engine 12. The flywheel powered barring engine system 26 is coupled with the accessory gearbox 24 via the accessory gearbox shaft 28.

Then, the gas turbine engine 12 is operated so that the rotor 22 of the gas turbine engine 12 drives the accessory gearbox 24. The driving of the accessory gearbox 24 drives the accessory gearbox shaft 28, which drives the flywheel shaft 34 so that rotational energy from the accessory gearbox 24 is stored in the flywheel 36. The first overrunning clutch 40 is coupled between the accessory gearbox shaft 28 and the flywheel shaft 34. The first overrunning clutch 40 is configured to transfer rotational energy from the accessory gearbox shaft 28 to the flywheel shaft 34.

Next, the gas turbine engine 12 is shut down. After the gas turbine engine 12 is shut down, the flywheel shaft 34 drives the accessory gearbox shaft 28 so that the flywheel 36 drives rotation of the rotor 22 of the gas turbine engine 12. The second overrunning clutch 42 is coupled between the barring shaft assembly 38 and the accessory gearbox shaft 28. The second overrunning clutch 42 is configured to transfer rotational energy from the flywheel shaft 34 and the barring shaft assembly 38 to the accessory gearbox shaft 28.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine system comprising:
a gas turbine engine having a rotor and a turbine coupled with the rotor for rotation about an axis with the rotor,
an accessory gearbox connected with the rotor of the gas turbine engine and configured to be driven by the rotor of the gas turbine engine during operation of the gas turbine engine to power auxiliary sub-systems for the gas turbine engine, and
a flywheel powered barring engine system connected with the accessory gearbox and configured to drive rotation of the rotor of the gas turbine engine about the axis via the accessory gearbox after the gas turbine engine is shut down, the barring engine system including:
an accessory gearbox shaft coupled with the accessory gearbox and configured to be driven by and to drive the accessory gearbox,
a flywheel shaft assembly configured to store rotational energy from the accessory gearbox during operation of the gas turbine engine, the flywheel shaft assembly including a flywheel shaft and a flywheel coupled with the flywheel shaft for rotation therewith, and
a barring engine configured to selectively allow the accessory gearbox shaft to drive the flywheel shaft and the flywheel shaft to drive the accessory gearbox shaft, the barring engine includes a barring shaft assembly, a first overrunning clutch, and a second overrunning clutch, the first overrunning clutch being coupled between the accessory gearbox shaft and the flywheel shaft and configured to transfer rotational energy from the accessory gearbox shaft to the flywheel shaft in response to the accessory gearbox shaft rotating at a rotational speed greater than a rotational speed of the flywheel shaft, and the second overrunning clutch being coupled between the barring shaft assembly and the accessory gearbox shaft and configured to transfer rotational energy from the barring shaft assembly to the accessory gearbox shaft in response to the barring shaft assembly being driven by the flywheel shaft at a rotational speed greater than the rotational speed of the accessory gearbox shaft to cause the flywheel shaft to drive rotation of the rotor of the gas turbine engine about the axis via the accessory gearbox shaft and the accessory gearbox after the gas turbine engine is shut down to prevent bowing of the rotor due to thermal gradients within the gas turbine engine.

2. The gas turbine engine system of claim 1, wherein the first overrunning clutch is a sprag clutch and the second overrunning clutch is a sprag clutch.

3. The gas turbine engine system of claim 1, wherein the accessory gearbox shaft includes a first section and a second section, the first section located between the second section and the accessory gearbox, and the second section extends circumferentially around the flywheel shaft.

4. The gas turbine engine system of claim 3, wherein the first overrunning clutch is coupled between the second section and the flywheel shaft.

5. The gas turbine engine system of claim 4, wherein the barring shaft assembly includes a barring shaft and a reduction gearbox connected between the flywheel shaft and the barring shaft and the second overrunning clutch is coupled between the barring shaft and the first section of the accessory gearbox shaft.

6. The gas turbine engine system of claim 5, wherein the barring shaft includes a first shaft and a second shaft, the first shaft is connected with the reduction gearbox, and the second shaft is arranged circumferentially around the first section of the accessory gearbox shaft and connected to the first shaft of the barring shaft via a gear coupling.

7. The gas turbine engine system of claim 1, wherein the barring shaft assembly includes a barring shaft and a reduction gearbox connected between the flywheel shaft and the barring shaft.

8. The gas turbine engine system of claim 7, wherein the reduction gearbox is configured to drive rotation of the barring shaft at the rotational speed of the barring shaft which is less than the rotational speed of the flywheel shaft.

9. The gas turbine engine system of claim 7, wherein the barring shaft includes a first shaft and a second shaft, the first shaft is connected with the reduction gearbox, and the second shaft is arranged circumferentially around the accessory gearbox shaft and connected to the first shaft via a gear coupling.

10. The gas turbine engine system of claim 1, wherein the second overrunning clutch is configured to engage with the accessory gearbox shaft only when the gas turbine engine is shut down.

11. A method of rotating a rotor of a gas turbine engine system, the method comprising: providing a gas turbine engine having a rotor and a turbine coupled with the rotor for rotation about an axis with the rotor, an accessory gearbox connected with the rotor of the gas turbine engine and configured to be driven by the rotor of the gas turbine engine during operation of the gas turbine engine to power auxiliary sub-systems for the gas turbine engine, and a flywheel powered barring engine system connected with the accessory gearbox and configured to drive rotation of the rotor of the gas turbine engine about the axis via the accessory gearbox after the gas turbine engine is shut down, the barring engine system including: an accessory gearbox shaft coupled with the accessory gearbox and configured to be driven by and to drive the accessory gearbox, a flywheel shaft assembly configured to store rotational energy from the accessory gearbox during operation of the gas turbine engine, the flywheel shaft assembly including a flywheel shaft and a flywheel coupled with the flywheel shaft for rotation therewith, and a barring engine configured to selectively allow the accessory gearbox shaft to drive the flywheel shaft and the flywheel shaft to drive the accessory gearbox shaft, the barring engine includes a barring shaft assembly, a first overrunning clutch, and a second overrunning clutch, the first overrunning clutch being coupled between the accessory gearbox shaft and the flywheel shaft and configured to transfer rotational energy from the accessory gearbox shaft to the flywheel shaft in response to the accessory gearbox shaft rotating at a rotational speed greater than a rotational speed of the flywheel shaft, and the second overrunning clutch being coupled between the barring shaft assembly and the accessory gearbox shaft and configured to transfer rotational energy from the barring shaft assembly to the accessory gearbox shaft in response to the barring shaft assembly being driven by the flywheel shaft at a rotational speed greater than the rotational speed of the accessory gearbox shaft to cause the flywheel shaft to drive rotation of the rotor of the gas turbine engine about the axis via the accessory gearbox shaft operating the gas turbine engine so that the rotor of the gas turbine engine drives the accessory gearbox, driving the flywheel shaft via the accessory gearbox shaft so that rotational energy from the accessory gearbox is stored in the flywheel, shutting down the gas turbine engine, and driving the accessory gearbox shaft via the flywheel shaft so that the flywheel drives rotation of the rotor of the gas turbine engine.

\* \* \* \* \*